United States Patent Office.

ROBERT NEWALL, OF MARIETTA, OHIO.

IMPROVED METHOD OF DEODORIZING PETROLEUM.

Specification forming part of Letters Patent No. 53,656, dated April 3, 1866.

*To all whom it may concern:*

Be it known that I, ROBERT NEWALL, of Marietta, Washington county, State of Ohio, have invented a new and useful Improvement in Deodorizing Petroleum; and I do hereby declare that the following is a full, clear, and exact description thereof, which will enable others skilled in the art to make and use the same, reference being had to the accompanying drawings, forming part of this specification.

This invention consists in a new method of deodorizing hydrocarbons, and is especially useful in treating the bad-smelling oils found in Kentucky and Canada, though it is also applicable to all descriptions of petroleum.

It is well known that some descriptions of petroleum are so offensive from the odors which they emit as to be of low value because of the great cost of deodorizing them, and because, also, the processes which are followed in attempting to remove their offensive smell are not successful.

My invention enables one to render such oils, however offensive in their natural character, as sweet as any other illuminating-oil, and at very small cost. It is well known, also, that these offensive oils—such, for instance, as are found in some parts of Canada—are too light for lubricating purposes, and they therefore will have but a small commercial value unless they can by a cheap and effective deodorizing process be made sweet and acceptable as illuminating-oils.

My invention consists in washing these offensive oils, as well as any other hydrocarbons which require to be deodorized, in a solution or lye composed of chloride of lime, one part; soda-ash of commerce, two parts; common lime, four parts, these ingredients being dissolved in twenty gallons of water and applied to the oil in the proportion of about five gallons of the lye to about twenty gallons of the oil, if very offensive. The quantity of lye used is lessened when the oil is of a less offensive character. Potash, caustic soda, sal-soda, or barilla and wood-ashes can be substituted for the soda-ash with good results. The oil is washed and treated by the lye in an open tank or tub without any other machinery or apparatus except such as may be used to agitate them together and stir them up. The treatment is continued for about the space of one hour for the most offensive oils. After the treatment the lye and impurities are removed from the oil in the ordinary way. The cost of this process of deodorizing is about one cent to a gallon of oil where the oil has a very offensive character. Oils of the character generally obtained in Pennsylvania, Ohio, and West Virginia can be deodorized by my invention at about half that cost—say about half a cent a gallon.

I claim as new and desire to secure by Letters Patent—

Deodorizing petroleum and other hydrocarbons by treating and washing them with a solution or lye containing chloride of lime, soda-ash, and common lime, or their several equivalents, in the proportions above stated, substantially as above described.

ROBERT NEWALL.

Witnesses:
E. B. ANDREWS,
STEPHEN NEWTON.